United States Patent [19]
Forbes et al.

[11] Patent Number: 5,659,768
[45] Date of Patent: Aug. 19, 1997

[54] SYSTEM AND METHOD FOR THE TIME REPRESENTATION OF TASKS

[76] Inventors: Kenneth S. Forbes, 1933-A Nelson Ave., Redondo Beach, Calif. 90278; David W. Pomerantz, 107 Greenwood St., Wakefield, Mass. 01880; Richard D. Barker, 11726 Magnolia Blvd., No. Hollywood, Calif. 91607

[21] Appl. No.: 439,846

[22] Filed: May 12, 1995

Related U.S. Application Data

[63] Continuation of Ser. No. 2,361, Jan. 6, 1993, abandoned.
[51] Int. Cl.$^6$ ............................................. G06F 15/00
[52] U.S. Cl. ............................................. 395/779
[58] Field of Search ........................... 395/140, 779, 395/780, 781

[56] References Cited

U.S. PATENT DOCUMENTS

| | | | |
|---|---|---|---|
| 4,019,027 | 4/1977 | Kelley | 235/89 R |
| 4,890,258 | 12/1989 | Tsugei et al. | 364/900 |
| 4,891,770 | 1/1990 | Hollett | 364/521 |
| 4,937,743 | 6/1990 | Rassman et al. | 364/401 |
| 5,043,916 | 8/1991 | Kawai | 364/518 |
| 5,129,057 | 7/1992 | Strope et al. | 395/161 |
| 5,179,657 | 1/1993 | Dykstal et al. | 395/161 |
| 5,181,273 | 1/1993 | Ohtani | 395/161 |
| 5,202,961 | 4/1993 | Mills et al. | 395/159 |
| 5,280,567 | 1/1994 | Kobayashi | 395/118 |
| 5,307,086 | 4/1994 | Griffin et al. | 345/146 |

*Primary Examiner*—Phu K. Nguyen
*Attorney, Agent, or Firm*—Roberts & Brownell

[57] ABSTRACT

The graphical time representation of tasks for depicting both graphical representation of tasks and alphanumeric representation of tasks. The graphical and alphanumeric representation of tasks are linked so that designation of a timebar results in the designation of a corresponding timecell and vice versa. The timebars and timecells can be manipulated in a coordinated manner. Timebars automatically display symbols indication of the type of manipulation permitted upon designation by a user.

18 Claims, 8 Drawing Sheets

29 points to 17 (Jun); 27 points to row containing 18–24 May.

| DISPATCH ▼ | | AVAILABILITY | | WORK SCHEDULE | | HOURS |
|---|---|---|---|---|---|---|
| | | START | END | START | END | |
| ✓ MARY FOSTER | DISPATCHER | ANY | ANY | 0:00 | 8:30 | 8:00 |
| JAMEE HOEG | DISPATCHER | ANY | ANY | 0:00 | 8:30 | 8:00 |
| ✓ FELICIA KING | CUST SVC AGENT | ANY | ANY | 5:00 | 13:30 | 8:00 |
| ARNOLD PINKNEY | CUST SVC AGENT | ANY | ANY | 5:00 | 13:30 | 8:00 |
| SONIA MILLS | CUST SVC AGENT | ANY | ANY | 5:30 | 14:00 | 8:00 |
| PHYLLIA MOTON | CUST SVC AGENT | ANY | ANY | 5:30 | 14:00 | 8:00 |
| MILDRED GRIFFIN | SCAN | ANY | ANY | 6:30 | 15:30 | 8:50 |
| STEVE PREY | CUST SVC AGENT | ANY | ANY | 6:30 | 15:00 | 8:00 |
| DORE RAMOS | CUST SVC AGENT | ANY | ANY | 6:30 | 15:00 | 8:00 |
| ✓ McKINE BRENNON | CUST SVC AGENT | ANY | ANY | 7:30 | 16:00 | 8:00 |

FIG. 8

SYSTEM AND METHOD FOR THE TIME REPRESENTATION OF TASKS

This application is a continuation of U.S. patent application Ser. No. 08/002,361, filed Jan. 6, 1993 now abandoned.

BACKGROUND OF THE INVENTION

1. Field of the Invention

The invention relates to a method and apparatus for creating, interacting with and deriving relevant scheduling information from the time representation of tasks via computer with a variety of display and manipulation capabilities.

2. Background of the Invention

The scheduling of scarce and valuable resources is a process which is critical to the success of almost every endeavor. The establishment of a series of time-phased tasks, the allocation of certain resources to those tasks, the identification of dependencies between tasks, and the interaction with those tasks to determine more efficient utilization of scarce resources is a process which, as a projects complexity grows, quickly becomes too complex and difficult for manual or mechanical means.

One approach to the complex scheduling problem is described in U.S. Pat. No. 4,019,027 to Kelley which describes a transparent panel on which a network schedule is mounted. Magnetic markers are positioned on the network schedule to represent scheduled events and a vertical bar is moved continuously by a clock driving mechanism to indicate current time relative to the planned events. This invention is primarily a manual apparatus, however, and does not provide for computer-supported automated interaction among tasks in the overall schedule.

U.S. Pat. No. 4,890,258 to Tsugei et al. describes a schedule setting method whereby schedule information is handwritten on a display, the information is digitized and stored in memory, and an alarm is activated to inform the user when a scheduled starting time is near. This invention also does not provide computer-supported automated processing or interaction among scheduled events.

In recent years, there has been a significant increase in the use of computers and computer display systems for creating, accessing and manipulating all types of data. Project managers, project planners and other Gantt chart drawing programs are well known. U.S. Pat. No. , 4,891,770 to Hollett relates to a computer aided design (CAD) system for inputting, processing, and displaying block diagrams. This invention however, uses a computer only to create and maintain a series of block diagrams. It's ability to allow tasks in a schedule to interact is severely limited and only operates with the block diagram format.

U.S. Pat. No. 4,937,743 to Rassman et al. describes a method and system for scheduling, monitoring, and dynamically managing a fixed set of resources using a computer system. In the Rassman invention, automated computer support does provide for a data base of information which is displayed relative to a fixed set of resources. While the data base can be updated, the invention does not provide for dynamic update of the information or for an interactive user interface.

U.S. Pat. No. 5,129,057 to Strope et al. relates to a method for presenting electronic day calendar information along with data being processed by an application program. This invention provides for computer-supported display of calendar information simultaneously with information being provided by another application. While useful, this calendar information is not event-schedule oriented nor does it provide for user-interactive dynamic updating.

In all the art cited above, the level of computer-supported interactive manipulation of scheduled events and related data is rudimentary at best and frequently non-existent. The present invention seeks to solve this and other problems by providing for a comprehensive range of event-oriented schedule information to be input, processed, manipulated and displayed. The interactive user interface is truly dynamic and provides for numerous automated updates of linked information as the result of single manipulations. The full range of display options enables tailoring of a product that provides a maximum degree of usefulness to the user. Finally, all supporting data bases are interactively linked to the processing function and accessed via interactive user commands.

OBJECTS AND SUMMARY OF THE INVENTION

The invention relates to a system and a method for the graphical time representation of tasks. An object of the invention is to enable the input of task-related data in a variety of commonly available ways including keyboard and light pen.

Another object of the invention is to enable the selection and display of various parts of the data being displayed by pointing, utilizing a variety of devices and methods including a mouse, trackball, a touch-sensitive display screen, and stylus-sensitive display screen.

An additional object of the invention is to permit the dynamic rescaling of the timescale to the appropriate period varying from minutes to months.

The invention displays scheduled tasks which are input in alphanumeric form graphically as "timebars" annotated with text or graphics as unique identifiers. The invention also annotates the timebars with a pointer or cursor of a predefined shape. In so doing the invention is able to characterize the permitted rescheduling options for the timebar or task.

The invention also has the capability of placing a timebar within another timebar. This fulfills the object of identifying those tasks that are dependent on others.

The invention also creates "timecells" that is, the textual data that is associated with a given timebars. Timecells are continually linked with timebars such that update of one updates the other.

The simultaneous display of both timebars and timecells gives the user access to textual data representing the event displayed in timebar format and provides the capability to select timebars and timecells either independently or in a coordinated manner by merely pointing to a timebar or timecell with a pointing device such as a mouse, stylus, trackball, finger (if a touch sensitive screen is used) or other pointing means. If selected in a coordinated manner, the invention provides the capability of repositioning and resizing the timebar after timecell edit and dynamic updating the timecell while moving or resizing the timebar. These modification or operations are also conducted in a coordinated manner.

The invention depicts the placement of an event in time by providing a display of a standard Gregorian calendar on which tasks previously scheduled on certain days are shown. By continually updating a row of timecells and timebars displayed under each time interval, the invention represents the number and value of simultaneously scheduled events during each time interval. Finally, a table of possible events facilitates the identification of needed scheduling and identifies those events which have already been scheduled.

The method apparatus of the present invention described above provides the user with an interactive, visually supportive means of interacting with graphical time represented tasks using a wide variety of display, input and pointing capabilities.

BRIEF DESCRIPTION OF THE DRAWINGS

These and other aspects of the present invention will now be shown in more detail by reference to the following figures.

This invention runs on any standard "IBM"® compatible personal computer having the various generation of Intel® microprocessors (80286,80386, 80486) and other similar microprocessors. While the present invention runs on this type of equipment in its preferred embodiment, other computers such as Next®, SUN® or other workstations are also adequate to support use of the invention.

DETAILED DESCRIPTION OF THE INVENTION

Events to be scheduled are input by a user into the invention's data base using a variety of readily available input devices including but not limited to a keyboard. The time-based tasks are displayed on a cathode ray tube (CRT), liquid crystal or other type display readily available. Manipulation of the information is begun by selecting data by pointing. The pointing mechanisms are well known and include mouse, trackball, touch-sensitive screen, and stylus-sensitive screens among others. After pointing or selecting graphics generation logic of a standard nature known in the art creates the various graphical representations of tasks as timebars, creates other graphical symbols within timebars, and/or creates the animated appearance to a timebar or timecell that has been selected.

Figure 1:
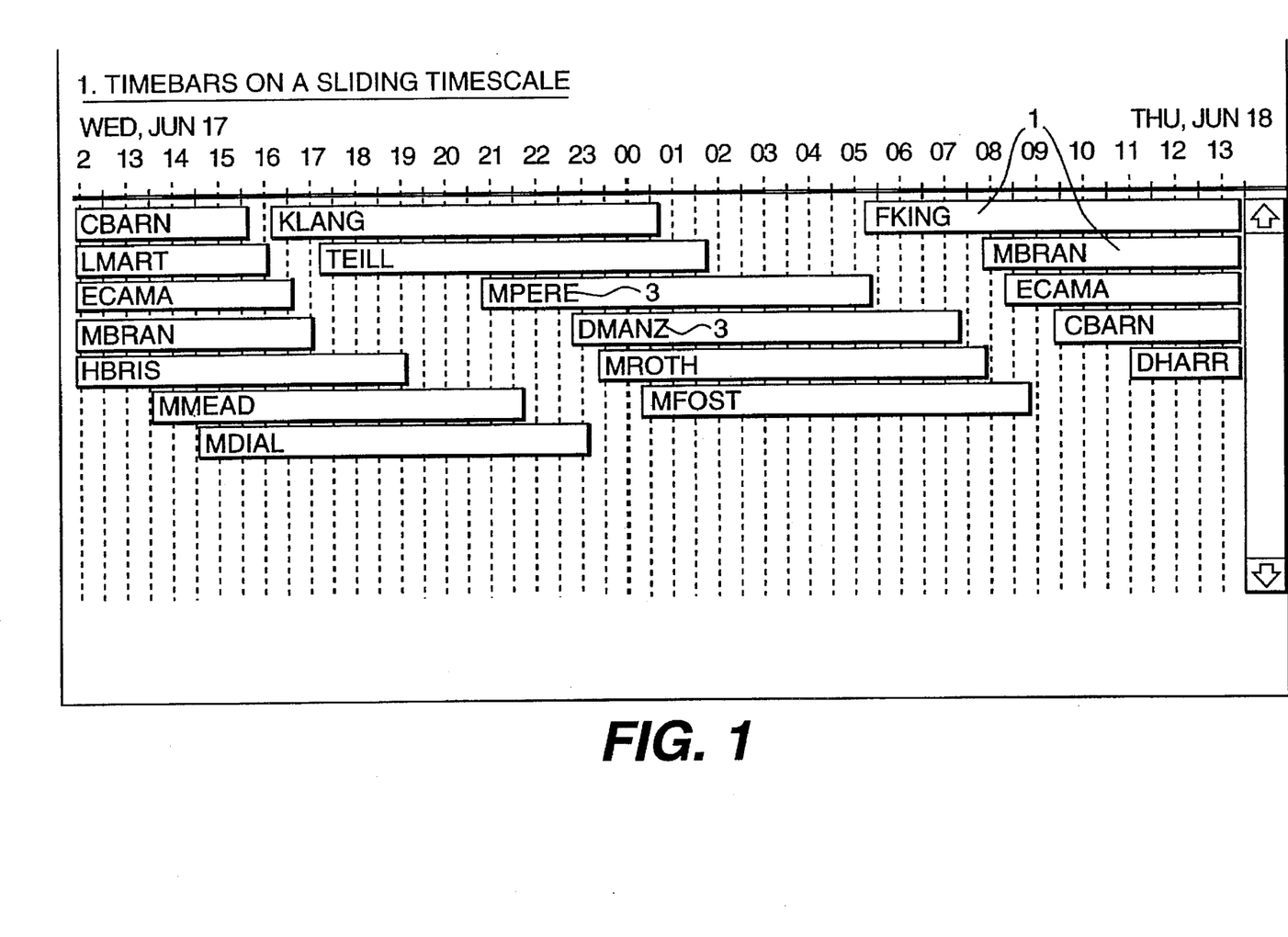
FIG. 1 shows the depiction of timebars, each of which is annotated with text which uniquely links the timebar to a scheduled event.

Referring to FIG. 1, timebars relating to scheduled events are shown. Scheduled events are represented by timebars 1, and are annotated with text 3 which links the timebar to a specific event, the "event identity." The timebars are displayed over a scrollable grid 5 which establishes the applicable time interval. Positioning the pointing device over a timebar and "clicking" the device selects the timebar.

Figure 2:
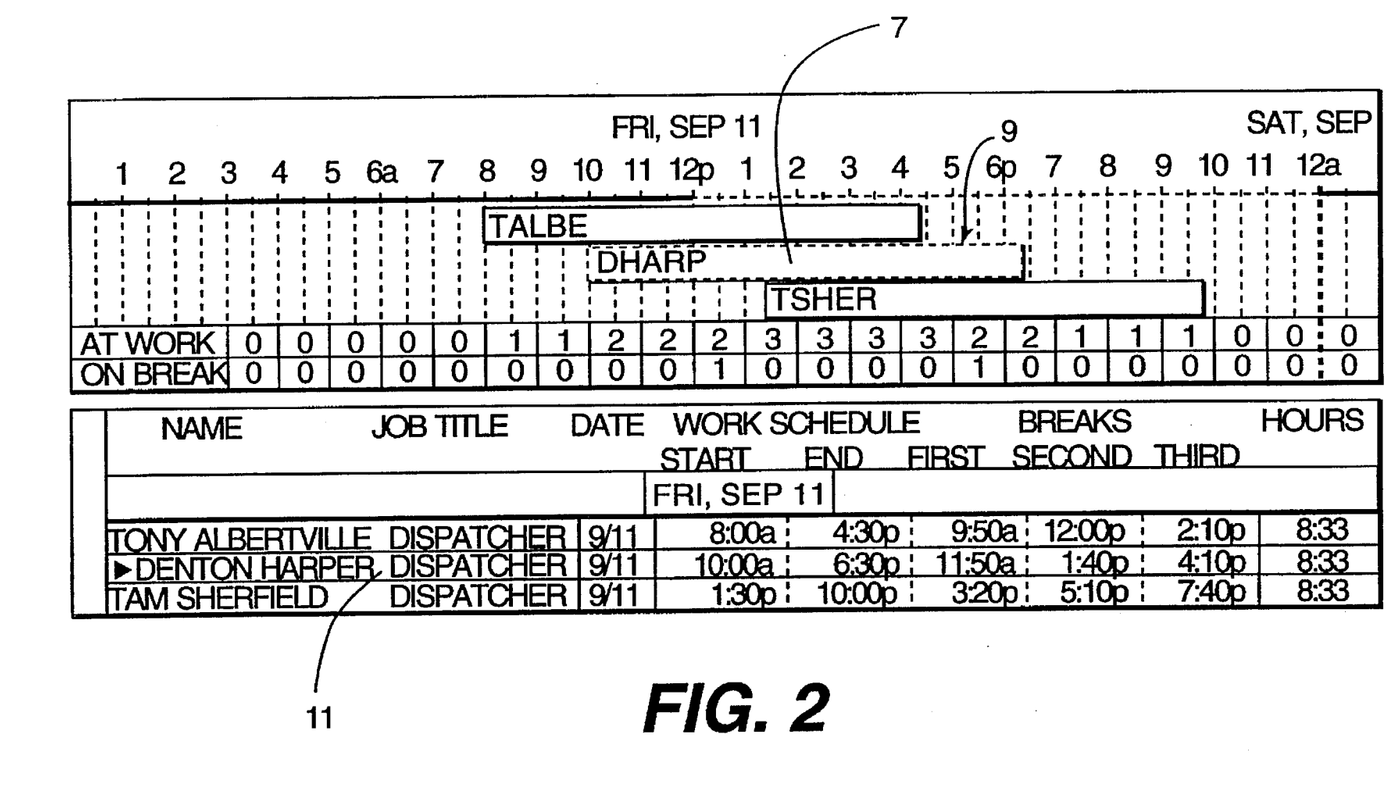
FIG. 2 shows a selected timebar and its automatically correlated timecell.

Referring to FIG. 2, timebars and their associated timecells are shown. The selection of a timebar with a pointing device is indicated on the display device by changing the color or shade of the timebar 7 not visible in the figure) and continually rolling a dotted rectangle 9 around the timebar to give the impression that the edge of the rectangle is animated. In addition, selection of the timebar causes the timecell row 11 in the timecell table that corresponds to the timebar to be displayed and highlighted with an arrow and extra lines inside the text area of the row.

The system recognizes a selection process or "device click" on a timebar utilizing the following method (in the following method, "selecting" means setting a Boolean value in the timebar true and adding the timebar to a list of selected timebars):

```
If the device click occurs over the display
  Look through all the currently displayed layers of timebars,
  from the most dependent layer to the least dependent layer.
  The dependent layer is "above" its parent layer in terms of
  being able to receive a device click. If the point clicked is
  within a timebar, determine if it's in the center, left, or
  right end of the timebar. This determines whether the user
  will be dragging the whole timebar or just one end of it.
  If no timebar is clicked
    unselect all timebars.
  else if the timebar is not selected
    unselect all timebars and select the one clicked setup
    for calling the timebar movement routine
  else if the timebar is selected
    unselect the timebar
```

An event is defined by a start time and an end time or a start time and a duration. Duration is stored with a precision of two bytes or four bytes depending on the expected length of the event. The interpretation of the event for graphical display uses the times and/or durations in the event compared with the time scale being displayed to draw a time bar representing the event.

The present invention accounts for time accurate to within one minute to correspond to the maximum accuracy normally required by people when scheduling and planning. There is no technical reason why the precision could not vary from milliseconds to days should other time granularities be necessary. Time is stored as a four-byte number. The first two bytes is an integer day, projecting 89years backward from Jan. 1, 1970 and 89 years forward for a total range of 179 years centered on 1970. The second two-bytes is a minute within the day, zero to 1439. This time element is represented in the C++ code as a TDateTime object. The timebars are scaled horizontally to the current timescale using the basic conversions discussed below.

In order to convert an event to a timebar, the user supplies the starting time of the timescale and the event and the present invention creates a rectangle to surround and graphically represent the event. The conversion process described below sets the horizontal coordinates of the rectangle.

The vertical coordinates for the placement of timebars do not depend on time, and are based on other constraints. In a static display, i.e. one that cannot be manipulated by the user, the only constraint is that timebars that overlap in time may not overlap in the two-dimensional space of the display. If two timebars overlap, one of them is positioned so it does not overlap the other. Since it is critically important that timebars are displayed in a consistent pattern, an additional constraint is that they start at one corner of the window and descend or ascend from that point. The preferred embodiment starts at the upper left corner, but the process would work from any point.

In a dynamic display, the user may "grab" and "move" one or more timebars, using the pointing device. The moved timebar, when released, may spacially overlap another timebar on the display. The horizontal coordinates of the timebars are readjusted by the invention to eliminate this spatial overlap. To prevent the moved timebar from dropping to the bottom of the display and necessitating constant scrolling by the user, the invention adds an additional constraint is added that any timebar which had a previous vertical position finds the closest unoccupied vertical position and is moved there.

The following method is used to calculate the vertical layout variables: Each timebar has its row position recorded in its data structure. If the timebar has not yet been drawn its row position is −1. If it has been drawn (and therefore repositioning of that timebar is to be avoided) the timebar is given a row position greater than −1. The present invention creates an array that holds the right coordinate of the right most timebar of each row. This array is capable of holding coordinates for all defined timebars regardless of when those timebars start. The logic of timebar row position selection is as follows:

```
For each layer
    sort the timebars by the left edge of rectangle, i.e.
        start time
    create array-large enough to hold all the
        timebars
    initialize all array entries to a large negative value
        the array contains the right edge of the rightmost
        timebar at that vertical offset
    for each timebar
        row + −1
        oldRow = timeBar.row
        if (oldRow!= −1)
            find the nearest row for which
                Array(row)<=timebar.leftEdge
        else find the first row (from zero) for which
            array(row)<=timebar.leftEdge
```

The user communicates the user's intention to manipulate the timebar by placement of the pointer on the timebar. Placement of the pointer on the left end of a timebar communicates the intent to change the start time; placement on the right end of a timebar communicates the intent to change the end time; and placement in the center of the timebar communicates the intent to move the entire timebar.

Figure 3A:
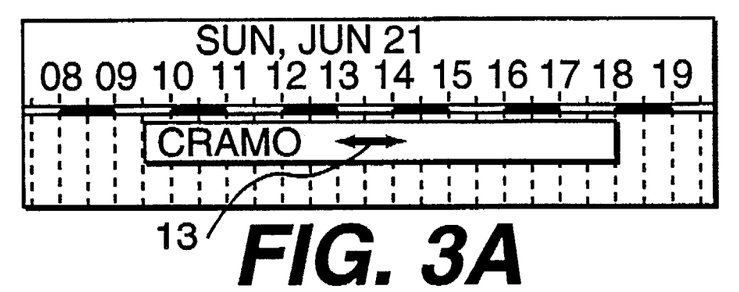
FIG. 3 illustrates an annotated timebar with the pointer (or cursor) representing the manipulations which are permitted for that event.
Figure 3B:
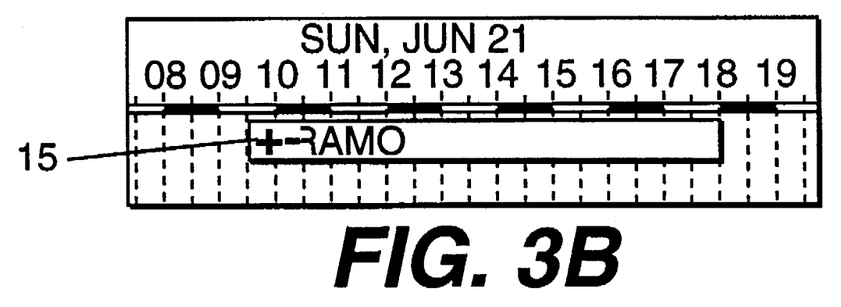
Figure 3C:
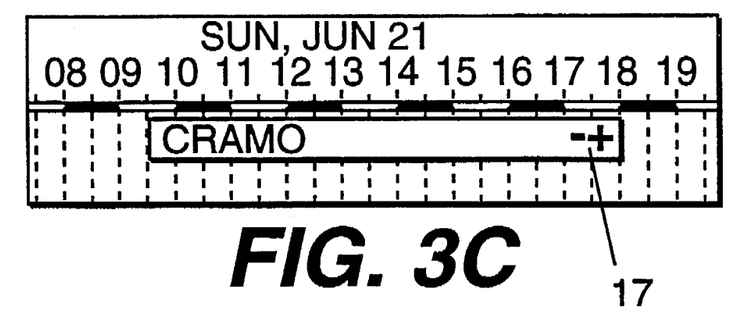

Referring to FIG. 3 a user given graphical feedback when manipulating timebar position. When the pointer is positioned on a timebar the invention indicates the permissible manipulation for that scheduled event. For example a double-ended arrow 13 indicates the entire timebar may be repositioned. A plus-minus cursor 15 indicates a timebar can have its start time changed. A minus-plus cursor 17 indicates a timebar can have its end time changed.

Figure 4:
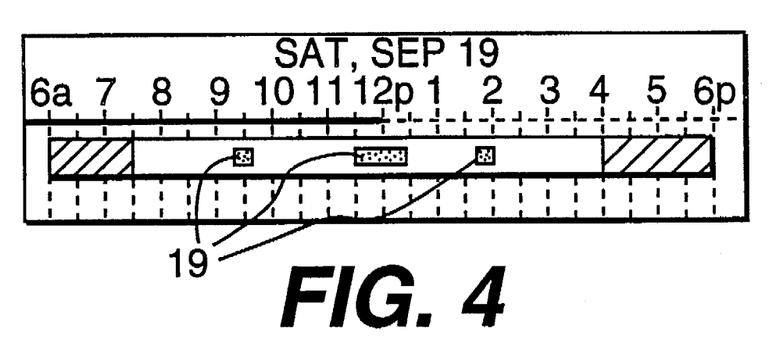
FIG. 4 illustrates annotated timebars displayed with timebars enclosed within other timebars, indicating dependencies.

Referring to FIG. 4, events contained within other events ("contained events") are shown. FIG. 4 depicts timebars 9 enclosed within other timebars indicating a dependency between the scheduled events. This illustrates the graphical manner in which the present invention deals with events containing other events. Contained events are logically constrained to start and end within the event containing them.

All events are read from the database into lists within main memory of the computer. The event type determines its layer. Each event is linked both to its containing events and to its contained events by database identifiers. The object TTimeBar contains an array for each layer (i.e. events, contained events). The layers are filled with data as follows:

The user selects a particular time the user wishes to examine.

Calculate the range of time from the time selected by the user (start of range) and the width of the graphical window in pixels (see Scaling for the conversion technique).

Scan the database for all events where:

event.start<= range.end AND event.end>= range.start

For each qualifying event, get its type and add it to the list corresponding to its layer.

When one layer of timebars is displayed, the timebars are assigned to rows according to the method for calculating vertical layout described above. When multiple layers are displayed, only the topmost, independent, layer uses that vertical layout method described above. The dependent layers are given their row assignments from the layers on which they depend. For example, in a three-layer display, the invention uses the method described below once to assign the rows of the first layer to the second layer, and again to assign the rows of the second layer to the third layer.

```
Method for Assigning Rows to Dependent Layers
FromLayer(...) The layer that has row assignments
ToLayer(...) The layer that's receiving row assignments
Correlating ID. The identifier in the timebar that associates
    the dependent layer with the independent layer.
Sort the FromLayer array by Correlating ID.
Sort the ToLayer array by Correlating ID.
iFrom=0
nFrom=sizeof(FromLayer)/sizeof(timebar)
iTo=0
nTo=sizeof(ToLayer)/sizeof(timebar)
While (iTo<nTo)
    //Advance iFrom to match the correlating id in the
        current ToLayer record
    while ((Correlating ID of ToLayer (iTo)<Correlating ID of
        FromLayer (iFrom)) &&
        (iFrom<nFrom))
        ++iFrom
    while (Correlating ID of ToLayer (iTo)==Correlating ID of
        FromLayer(iFrom))
        copy the row number from FromLayer to ToLayer
        calculate the timebar rectangle top and bottom.
            this may be at a slight offset from the
            FromLayer's top and bottom so the dependent
            timebar is inset
        ++iTo
```

When the user wants to change the view or display to a different layer or set of layers, the vertical offsets must be recalculated. Switching layers may also mean a change of timescale. If the timescale is changed, the list of events will be different since a window of a given pixel width has a different width in minutes depending on the timescale. Even if the timescale remains the same, the vertical offsets (rows) will change. For example, an initial display will indicate dependent events contained within the displayed timebars, but the vertical layout is determined based on the current topmost layer. Changing the view means designating these layers previously displayed as dependent layers of timebars, topmost layers. Then the method for calculating vertical layout is executed once again on the topmost layer to reconcile the new display view.

Figure 5:
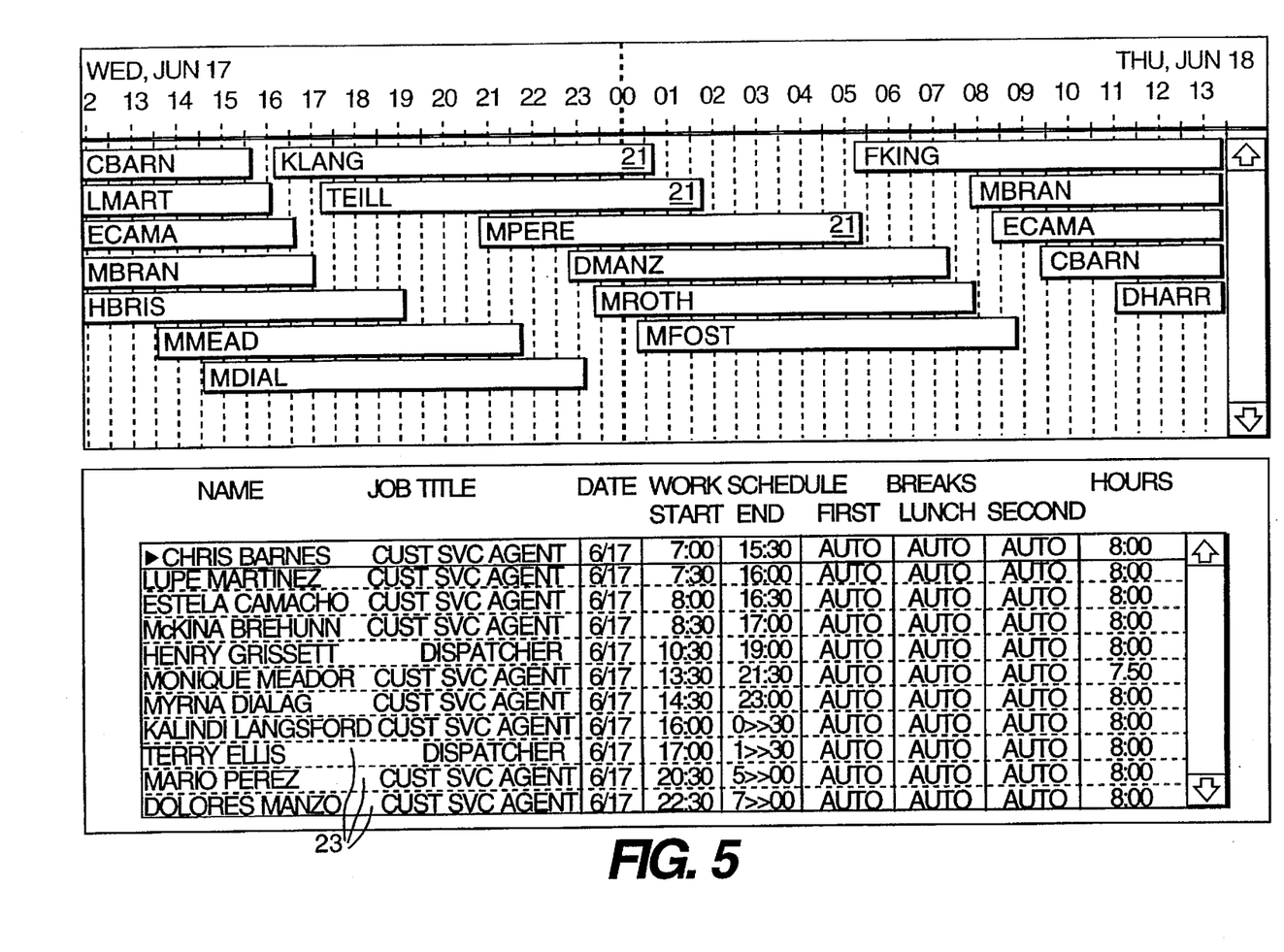
FIG. 5 illustrates annotated timebars with the simultaneous display of the timecell data which represents those scheduled events.

Referring to FIG. 5, timebars and associated timecells are shown. The linkage between timebars 21 and the corresponding timecells 23 is shown in this FIG. 5. By simultaneously displaying the timebars and the corresponding timecells, the user can select either timebars or timecells independently or in a coordinated manner. Since timecells correspond more closely to the non-computer user's experience with the seeing schedules a user can textually manipulate the timecells to reflect schedule adjustments. A user can also manipulate the timebars with a pointing device making appropriate schedule changes graphically. A key concept of the present invention is the use of both representations (timebars and timecells) simultaneously. In all cases, manipulation of one (timebar or timecell) results in manipulation of the other.

If selection is coordinated then editing the timecell information causes repositioning and resizing of the timebars and moving/resizing the timebar causes a dynamic update of the timecell. When the pointing device is dragged over the timebar a gray outline of the timebar moves in proportion to the pointing device movement. As the timebar is moved, the table is updated for each time increment of motion. If the timebar is being repositioned, both the start and end times are highlighted and updated continually with each minute of motion. If the timebar is being shortened or lengthened, only the start or the end time is highlighted and updated continually, depending on whether the left or right edge of the timebar is being dragged. The method for moving a timebar follows:

```
This method is invoked by the pointing device click method
   above
setup for updating the table
draw the timebar with a gray outline using an XOR drawing mode
set originalDifference to zero
While the device button is depressed
   minutesDifference=scale.Minutes(pixel of movement)
   if (minutesDifference!=originalDifference)
      originalDifference=minutesDifference
      draw the timebar with XOR (erases previous
         image)
      if only moving the end of the timebar
         change the timebar right edge by pixels of
            movement
         adjust end time
      if only moving the start of the timebar
         change the timebar left edge by pixels of
            movement
         adjust start time
      if moving both ends
         change the left and right edges by pixels of
            movement
         adjust start and end times
      draw the timebar with XOR (draws new image)
      call method to update the table
draw the timebar with XOR (erases previous image)
update start & end times in timebar and any associated data
   items
```

When the user "clicks" on a timebar, the present invention immediately prepares for dragging the timebar and the simultaneous updating the timecells. As has been previously described, the placement of the cursor on the timebar determines if the user intends to move only the start, only the end, or the entire timebar. The method for setting up the timecells for timebar movement is as follows:

```
For the selected table row
   if only moving the end of the timebar
      invert the table cell displaying the end time
      invert data associated with timebar length
   if only moving the start of the timebar
      invert the table cell displaying the start time
      invert data associated with timebar length
   if moving both ends
      invert the table cell displaying the start and end
         times
```

While the timebar is being dragged, every time the timebar position is updated, the following table method is called:

```
For the selected table row
   if only moving the end of the timebar
      display the new end time
   if only moving the start of the timebar
      display the new start time
   if moving both ends
      display the new start and end times
```

Figure 6:
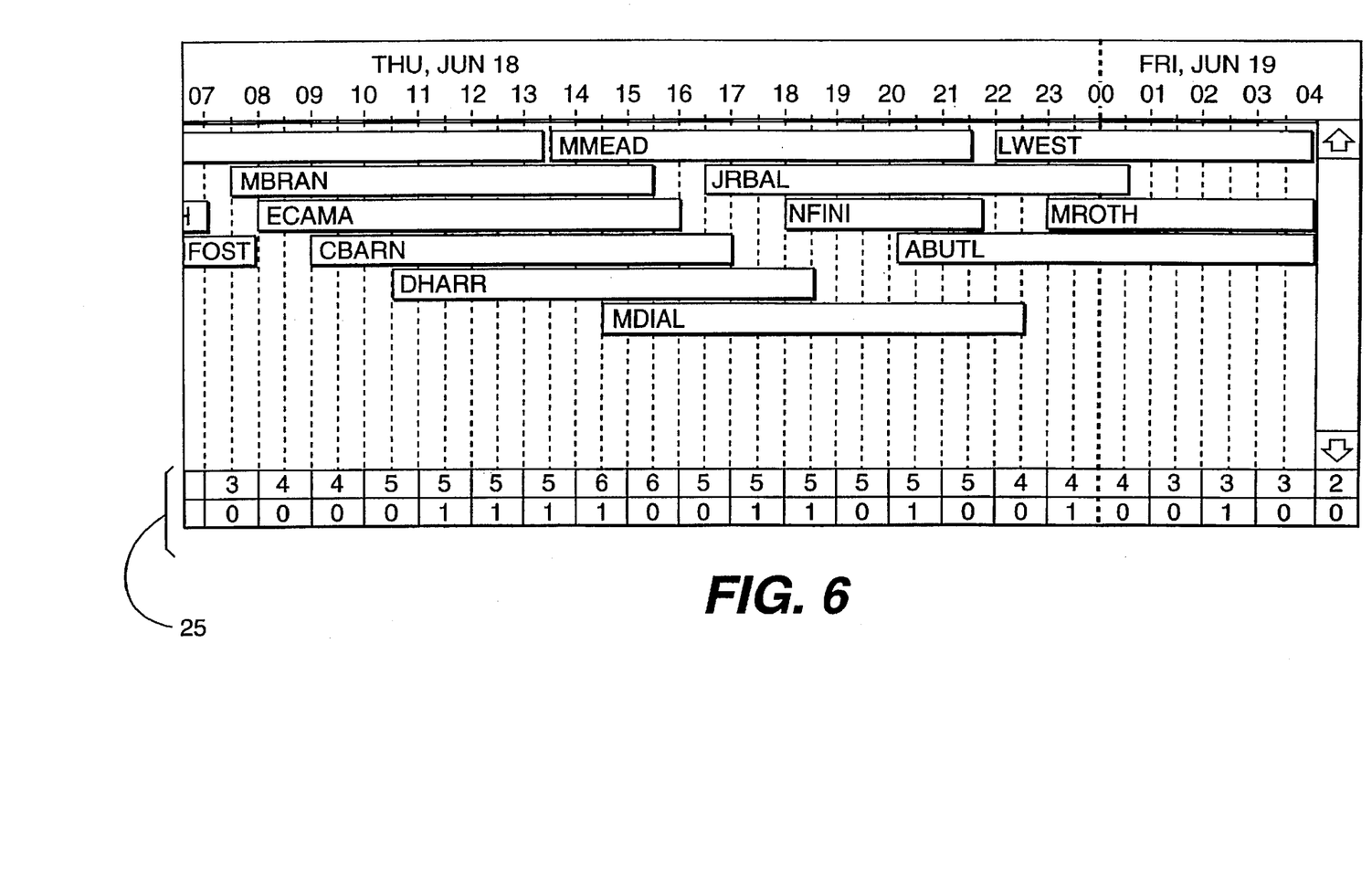
FIG. 6 illustrates a display of annotated timebars on a background grid with a row of cells displayed at the bottom which indicates the number and value of simultaneous scheduled events during each time interval.

The timescales chosen for the preferred embodiment use integer values for speed and limit the number of scales to nine for reasons of practicality. Alternative embodiments have no theoretical limit to the number of time scales using floating point calculations with conversion factors using as quantities a) the number of pixels per fifteen minutes and b) a 480 pixel view. Referring to FIG. 6, the capability to vary the timescale to determine the simultaneous use of resources during any time period is displayed 25.

Figure 7:
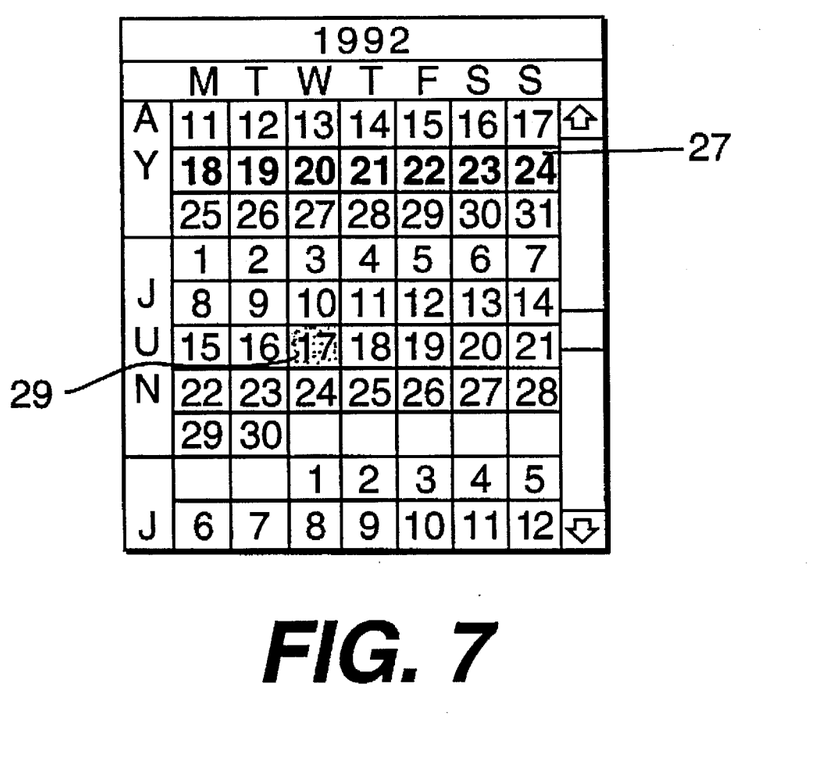
FIG. 7 illustrates a standard Gregorian calendar with days on which events that have been scheduled are distinguished.

Referring to FIG. 7, the determination of a time frame for scheduling an event is provided for the user by a display which depicts days on which events are scheduled by boldface 27, larger font size or other highlighting techniques 29.

Figure 8:
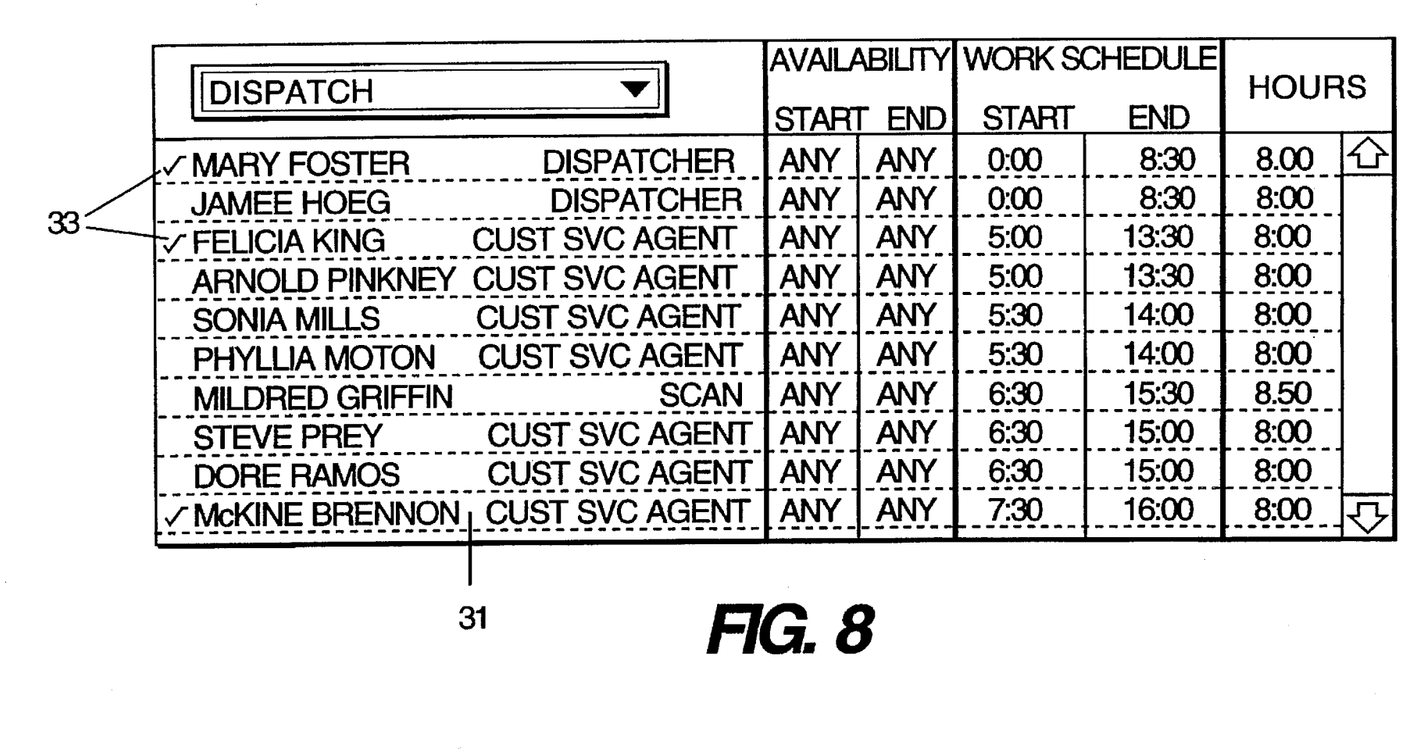
FIG. 8 illustrates a table of possible events to provide support to the user when scheduling.

Referring to FIG. 8, it is shown how the user is supported in scheduling events by displaying a Table of Possible Events. This is a table of generic or specific events that can be scheduled 31. Those events which have already been scheduled are marked with a check 33 so that a user knows they have already been acted upon.

How to Use

The user would begin using this invention by defining a number of events to be scheduled by specifying and inputting at least an identification of the event, the start time of the event, and either a duration of an end time to the event. By specifying a timescale and a starting date for the display, the user would cause the invention to display a series of timebars uniquely identified as representing particular events over a scrollable grid with time increments over the calendar period specified. Selecting individual timebars using the available pointing devices enables manipulation of the timebar and causes the appropriate timecell data to be displayed near the bottom of the screen.

The user communicates the user's manipulation intent by placement of the pointing device cursor when selecting the timebar. Placement of the cursor in the left portion of the timebar indicates an intent change the start time; placement in the right portion of the timebar indicates an intent to change the end time; and placement of the cursor near the middle of the timebar indicates an intent to move the timebar. The invention provides feedback to the user of the interpretation of the user's intent by displaying the cursor in a pre-defined form i.e. a double-ended arrow to indicate the timebar can be repositioned; a plus-minus cursor to indicate the timebar can have its start time changed; or a minus-plus cursor to indicate the timebar can have its end time changed.

The user can establish dependencies between events and manipulation of any event then provides feedback to the user of the effect on all dependent events. By calling the resource display, the user can tract the simultaneous use of resources in each of the defined time periods.

To identify the need and capability to schedule additional events, the user can display a table of possible events to be scheduled and select events from this table. Display of the provided Gregorian calendar graphically depicts scheduling timeframes as well as identifies days on which events are already scheduled.

Summary

A highly flexible system and method for the time representation of tasks has been described. With the present invention, not only can interdependencies of tasks be shown graphically, but such graphical representations are linked to other table data where an update of either the graphical or text data results in an update to the other. Other enhancements to the invention will be possible and apparent to those skilled in the art without departing from the letter and spirit of the present invention as defined.

What is claim is:

1. A data processing system for presenting a graphical time representation of tasks, comprising:
   a. input means for accepting and changing task data, the task data comprising data representing a task description, data representing a task schedule start time, and data representing a task schedule finish time;
   b. storage means, connected to the input means, for storing the task data;
   c. logic means, connected to the storage means, for converting the task data to graphical image information in the form of a timebar and a timecell;
   d. display means, connected to the logic means, for displaying the timebar and the timecell; and
   e. selection means, connected to the logic means, for selecting and changing the timebar and the timecell and for selecting and changing a portion of the timebar and a portion of the timecell;
   f. the timebar comprising a graphical representation of the data representing a task schedule start time and the data representing a task schedule finish time;
   g. the timecell comprising a graphical and alphanumeric representation of the data representing a task description; and
   h. the logic means comprising linking means for linking the task data stored in the storage means with the timebar and the timecell such that a change made directly to the stored task data through the use of the input means is automatically reflected in the timebar and in the timecell, and such that a change made directly to the timebar or the timecell through the use of the selection means is automatically reflected in the stored task data.

2. The data processing system of claim 1, wherein the selection means is a cursor pointing means.

3. The data processing system of claim 2, wherein the cursor pointing means is selected from the group of cursor pointing means consisting of a mouse, a trackball, an input stylus, and touch sensitive screen means.

4. The data processing system of claim 1, wherein the input means is a keyboard.

5. The data processing system of claim 1, wherein the logic means further comprises means for displaying a plurality of said timebars on the display means.

6. The data processing system of claim 5, wherein the logic means further comprises means for scrolling the display means such that selected timebars may be viewed on the display means.

7. The data processing system of claim 1, wherein the logic means further comprises means for displaying a plurality of said timecells on the display means.

8. The data processing system of claim 7, wherein the logic means further comprises means for scrolling the display means such that selected timecells may be viewed on the display means.

9. The data processing system of claim 1, wherein the logic means further comprises means responsive to the selection means such that the stored task data and the graphical image information change when a particular timebar is selected and changed by the selection means.

10. The data processing system of claim 1, wherein the logic means further comprises means responsive to the selection means for changing the stored task data and the graphical image information when a particular timecell is selected by the selection means and when new task data is accepted by the input means.

11. The data processing system of claim 1, wherein the logic means further comprises means for converting principal task data to principal graphical image information, and wherein the logic means further comprises means for converting dependent task data to dependent graphical image information, the dependent graphical image information being graphically depicted on the display means as being located within the principal graphical image information.

12. A method for the graphical time representation of tasks, comprising the steps of:
   a. accepting task data, the task data comprising data representing a task description, data representing a task schedule start time, and data representing a task schedule finish time;
   b. storing the task data;
   c. converting the task data to graphical image information in the form of a timebar and a timecell;
   d. displaying the timebar and the timecell; and
   e. linking the stored task data with the timebar and the timecell such that a change made directly to the stored task data through the use of the input means is automatically reflected in the timebar and in the timecell, and such that a change made directly to the timebar or the timecell through the use of the selection means is automatically reflected in the stored task data;
   f. the timebar comprising a graphical representation of the data representing a task schedule start time and the data representing a task schedule finish time; and
   g. the timecell comprising a graphical and alphanumeric representation of the data representing a task description.

13. The method of claim 12, further comprising the step of displaying a plurality of said timebars.

14. The method of claim 13, further comprising the step of scrolling such that selected timebars may be viewed on the display means.

15. The method of claim 12, further comprising the step of displaying a plurality of said timecells.

16. The method of claim 15, further comprising the step of scrolling such that selected timecells may be viewed on the display means.

17. The method of claim 12, further comprising the step of changing the stored task data and the graphical image information when a particular timecell is selected and when new task data is accepted.

18. The method of claim 12, further comprising the steps of:
   a. converting principal task data to principal graphical image information;
   b. converting dependent task data to dependent graphical image information; and
   c. depicting the dependent graphical image information as being located within the principal graphical image information.

* * * * *